US011314089B2

(12) United States Patent
Langner et al.

(10) Patent No.: US 11,314,089 B2
(45) Date of Patent: Apr. 26, 2022

(54) METHOD AND DEVICE FOR EVALUATING VIEW IMAGES

(71) Applicant: APPLE INC., Cupertino, CA (US)

(72) Inventors: Tobias Langner, Potsdam (DE); Martin Haller, Berlin (DE); Denis Williams, Krefeld (DE); Arnd Rose, Stahnsdorf (DE)

(73) Assignee: APPLE INC., Cupertino, CA (US)

(*) Notice: Subject to any disclaimer, the term of this patent is extended or adjusted under 35 U.S.C. 154(b) by 452 days.

(21) Appl. No.: 16/080,381

(22) PCT Filed: Mar. 6, 2017

(86) PCT No.: PCT/EP2017/055219
§ 371 (c)(1),
(2) Date: Oct. 1, 2018

(87) PCT Pub. No.: WO2017/153354
PCT Pub. Date: Sep. 14, 2017

(65) Prior Publication Data
US 2019/0094542 A1     Mar. 28, 2019

(30) Foreign Application Priority Data
Mar. 7, 2016 (EP) ................................ 16159005

(51) Int. Cl.
*G02B 27/01* (2006.01)
*G06F 3/01* (2006.01)
(Continued)

(52) U.S. Cl.
CPC ..... *G02B 27/0172* (2013.01); *G02B 27/0093* (2013.01); *G02B 27/017* (2013.01);
(Continued)

(58) Field of Classification Search
CPC .......... G06F 3/013; G06F 3/012; G06F 3/017; G06F 1/163; G06F 3/011; G06F 3/015;
(Continued)

(56) References Cited

U.S. PATENT DOCUMENTS 7,046,924 B2 * 5/2006 Miller .................. G02B 27/017
                                                      348/231.3
9,081,436 B1 * 7/2015 Berme .................... G01L 5/163
(Continued)

FOREIGN PATENT DOCUMENTS

| EP | 2226758 A1 | 9/2010 |
|---|---|---|
| EP | 2499963 A1 | 9/2012 |
| WO | 2013059940 A1 | 5/2013 |

OTHER PUBLICATIONS

International Preliminary Report on Patentability for PCT/EP2017/055219 dated Sep. 11, 2018.
(Continued)

*Primary Examiner* — Brandi N Thomas
(74) *Attorney, Agent, or Firm* — Fernando & Partners, LLP

(57) ABSTRACT

The invention relates to a method for evaluating at least one view image (M) in order to image at least one viewpoint, which is provided in relation to at least one scene shot (S) of a scene (12), and/or at least one view direction of at least one person (10), said view direction being provided in relation to the at least one scene shot (S), towards a reference, the content of which matches at least one part of the scene (12). The at least one scene shot (S) is provided with the at least one assigned viewpoint (B) and/or the at least one assigned view direction, and the reference (R) is provided together with a result (B') of the at least one view image (M). Furthermore, the at least one view image (M) is evaluated by means of at least one predefined quality measurement (GM), and the result of the evaluation is provided.

20 Claims, 4 Drawing Sheets

Figure 1:
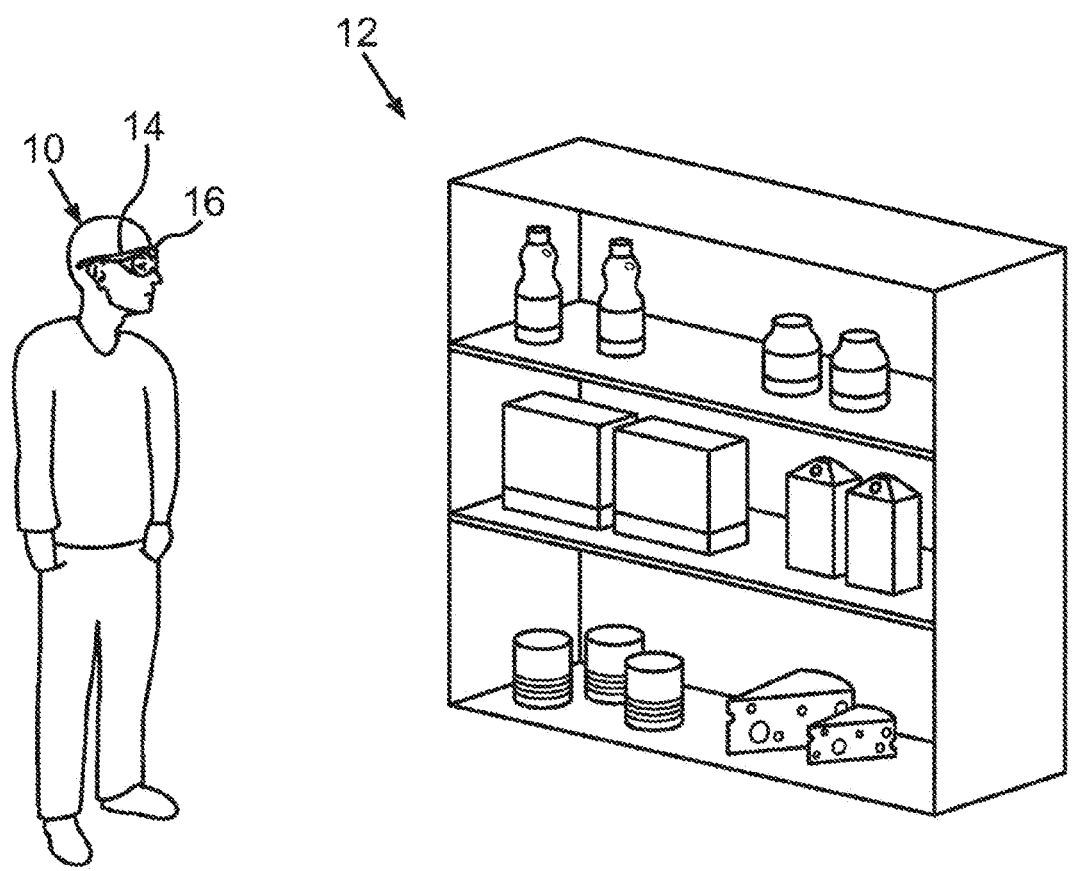

(51) Int. Cl.
*G06K 9/00* (2022.01)
*G02B 27/00* (2006.01)
*G06Q 30/00* (2012.01)
*H04N 13/344* (2018.01)
*G06Q 30/02* (2012.01)

(52) U.S. Cl.
CPC .............. *G06F 3/012* (2013.01); *G06F 3/013* (2013.01); *G06K 9/00671* (2013.01); *G06Q 30/00* (2013.01); *G06Q 30/0281* (2013.01); *H04N 13/344* (2018.05); *G02B 2027/014* (2013.01); *G02B 2027/0138* (2013.01); *G02B 2027/0187* (2013.01); *G06K 2209/17* (2013.01)

(58) Field of Classification Search
CPC .............. G06F 3/04842; G06F 3/167; G06F 2203/04806; G06F 3/0304; G06F 3/0484; G06F 21/316; G06F 21/32; G06F 21/64; G06F 2203/011; G06F 3/04817; G06F 3/0482; G06F 3/0334; G06F 3/0414; G06F 3/0346; G06F 3/04815; H04N 19/17; H04N 13/344; G02B 2027/0138; G02B 2027/014; G02B 2027/0187; G02B 27/0093; G02B 27/0172; G02B 27/017
USPC .................................................. 359/623–633
See application file for complete search history.

(56) References Cited

U.S. PATENT DOCUMENTS

| | | | |
|---|---|---|---|
| 2009/0129672 A1* | 5/2009 | Camp, Jr | H04N 19/17 382/173 |
| 2010/0129001 A1* | 5/2010 | Tsukada | G06T 7/0002 382/254 |
| 2011/0222796 A1* | 9/2011 | Nakamura | G06T 7/0002 382/309 |

OTHER PUBLICATIONS

International Search Report for PCT/EP2017/055219 dated May 17, 2017.

* cited by examiner

METHOD AND DEVICE FOR EVALUATING VIEW IMAGES

The invention relates to a method for evaluating at least one view image in order to image at least one viewpoint, which is provided in relation to at least one scene shot of a scene, and/or at least one view direction of at least one person, said view direction being provided in relation to the at least one scene shot, onto a reference, the content of which matches at least one part of the scene. At least one scene shot is provided with the at least one assigned viewpoint and/or the at least one assigned view direction, and the reference is provided together with a result of the at least one view image. The invention also includes a device for evaluating at least one view image.

View images, which are also called view direction images or viewpoint images, find application in many areas. One such area of application is, for example, consumer research or even the conducting of studies. For this purpose, eye trackers, e.g., head-mounted eye trackers, can be used which determine the view directions of a person while this person looks at a particular scene, e.g., his real surroundings or a display on a screen. In addition, a scene camera, which at the same time takes pictures of the surroundings of the person, covering at least a large part of the current field of view of such a person, can be attached to such a head-mounted device. As a result, for a specific point in time, the view data determined at that time by the eye tracker can be correlated with such a scene shot recorded at that time, and the direction in which the person looked at that time in relation to his surroundings can be determined therefrom. A procedure of this kind can then be carried out for an entire scene video so that each individual scene shot of this scene video then contains a corresponding viewpoint or a view direction of the person. In this way, it can be determined in which direction, for how long or how often a person looked at specific objects in his environment during this experiment or this study. On the basis of such test results, it can be determined, for example, which products on a supermarket shelf attract more attention and which less; which advertising catches the eyes of individuals more and which less, and so on. Normally such experiments are carried out not only with a single person but with many different persons, e.g., different age classes, genders, and so on in order to obtain statistically meaningful results from the findings.

However, since an evaluation of every single scene shot in such numerous scene videos with the corresponding view data is a very laborious matter, there is the possibility of also carrying out such an analysis automatically or at least simplifying it. This is where view images are used. It is thereby made possible, for example, to represent all of the viewpoints contained in a scene video on a single common reference. If, for example, a person looks from different perspectives at a particular shelf holding different products during the experiment, a picture of this shelf can, for example, be provided as a reference. All viewpoints recorded in relation to the scene video of this shelf can then be imaged onto this single reference shot with the shelf. As a result, a much better impression can be gained as to which objects on the shelf are viewed more or less frequently, and the comparability of the view data can be made significantly better. In this case, such a view image can even be created covering a plurality of individuals so that the viewing results of all individuals are imaged onto a common reference. In addition to this application example, there are also however numerous other possible applications for view images which image viewpoints and/or view directions in relation to a scene shot onto a reference.

On the one hand, such view images can be created manually, e.g., by one person viewing each scene shot together with the viewpoint it contains, and then plotting the corresponding viewpoint on the corresponding location, i.e., on the corresponding object or in the corresponding area of an object on the reference image. Since creating such a view image manually is very time-consuming and thus also cost-intensive, especially in the case of numerous scene shots and view data, there is also the possibility of creating such view images automatically. Certain algorithms can be used for creating such view images automatically. One such algorithm references, for example, the scene shot to the reference shot, and determines therefrom, for example, a transformation which images the scene shot, which was, for example, taken of a scene from a certain perspective, onto the reference, which was also taken of this scene but from a different viewing angle. Next, the transformation so obtained is applied to the viewpoint determined in relation to the scene shot, which yields the corresponding imaged viewpoint on the reference in relation to the reference. Such view images can however be obtained differently depending on the application.

In either case, i.e., both with the manual view image and with an automatic view image, errors can however occur, e.g., a viewpoint from one scene shot being imaged onto a wrong area or wrong object of the reference, or a viewpoint in a scene shot not being imaged at all onto the reference because the corresponding object was erroneously not found there. In the case of manual view images, errors of this kind are usually due to carelessness, fatigue, or the like. With automatic view images, this is largely due to the algorithms responsible for the view image, whereby errors in the referencing between images or in object recognition or classification can occur. This means that the results of such view image, that is, the viewpoints eventually imaged onto the reference and, for example, statistical statements derived therefrom or the results of other further processing steps, can be more or less reliable, wherein it is precisely the user who is left more or less in the dark in this respect. In order to nevertheless be able to obtain meaningful and reliable results, the quantity of input data must be increased accordingly. In other words, more scene videos or longer scene videos and more view data must be recorded and evaluated, which in turn greatly increases the effort spent on evaluation and data collection.

The object of the present invention is therefore to provide a method and a device which make it possible to reduce the effort required to achieve as reliable an overall result for view images as possible.

This object is achieved by a method and a device for evaluating at least one view image with the features according to the respective independent claims. Advantageous embodiments of the invention are the subject-matter of the dependent claims, the description, and the figures.

In the method according to the invention for evaluating at least one view image in order to image at least one viewpoint provided in relation to at least one scene shot of a scene and/or at least one view direction of at least one person, for example, a test person, provided in relation to the at least one scene shot, onto a reference, the content of which matches at least one part of the scene, for example, locally or temporally, the at least one scene shot with the at least one assigned viewpoint and/or with the at least one assigned view direction is provided, and the reference is provided together with a result of the at least one view image. Furthermore, the at least one view image is evaluated by means of at least one predefined quality measurement and a result of the evaluation is provided.

The one or even several predefined quality measurements advantageously make it possible to evaluate the quality of such a view image automatically and thereby quantify it objectively, whereby an objective statement about the reliability of the final result of such a view image can in turn advantageously be made. Although the reliability of a view image cannot be influenced by this directly, the effort to achieve a reliable overall result can still be significantly reduced, since the information about the quality of a particular view image is advantageously now known and can be used accordingly. If it is found, for example, that a view image is of high quality, or that correspondingly several view images are of high quality and thus of high reliability, it will not be necessary to collect additional input data, e.g., more scene shots and view data, which reduces overall effort significantly. As a result, view images can also advantageously be selected on the basis of their quality, and, for example, only reliable results of such view images be used for a final evaluation. Above all, however, such an evaluation can be carried out in a fully automated way, so that in comparison thereto, for example, to manually comparing whether viewpoints have been imaged well or poorly or not at all, a considerable time-saving and above all a greater reliability and objectivity can hereby be achieved as well, because specifying quality measurements makes possible the specification of objective criteria for evaluating the quality of a view image. Such quality measurements can, for example, each evaluate one aspect of the quality of such a view image. A quality value according to the quality measurement in question can be assigned accordingly to a view image. In this way, individual view images are advantageously made mutually comparable in regard to their quality, which in turn yields many advantageous application possibilities for utilizing such findings regarding the quality or reliability of the result of a view image.

The scene to which the scene shots relate can represent a real-world environment of the person or even a virtual environment, which is, for example, viewed with VR (virtual reality) glasses, or an image displayed on a display device or even a superimposition of virtual/digital image contents onto the real environment, such as when the scenes are viewed with AR (augmented reality) glasses.

The at least one scene shot can correspondingly relate to a picture of the scenes described above, and, for example, represent a camera shot of the environment of the person or the one display on a screen at a specific point in time as a kind of screenshot so to speak. Thus the at least one scene shot can represent a picture of a scene by means of one or more image sensors, a stereoscopic image sensor possibly with depth data associated with images, an array of image sensors, at least one camera and other data from one or more sensors, of a 3D scene recording in which a 3D scene is described as a composition of objects and possibly of a scene background structure, and/or the recording of a fixed or time-varying stimulus (such as a recording of screen contents). Data of a scene shot can also be temporally related to each other. In this respect, a scene shot, in particular in connection with a computer-generated scene or digital image contents of, for example, a computer-generated, virtual scene, is not necessarily to be understood as a recording by means of a camera or the capture or storage of a currently displayed 2D or 3D image of the scene but rather also, for example, the recording of the scene data of the entire computer-generated scene, for example, by storing or providing the scene data of the computer-generated scene, together with the specification of a virtual standpoint that defines the view or perspective of the person with regard to the currently displayed virtual scene. In order to determine the current perspective, a 3D pose of the person and/or the view direction can, for example, be captured, depending on which of these parameters causes a change in the perspective in relation to the scene. In typical VR applications using VR glasses, for example, a person can look around in the virtually displayed scene by moving his head and thereby change his view and thus the perspective in relation to the scene. Such head movements can also be captured accordingly, in particular together with the corresponding view direction of the person at this point in time, so that these data define the virtual perspective in relation to the virtual scene. This too can be understood as a scene shot.

View directions and/or view endpoints or viewpoints can be available as part of the eye-tracking data with a temporal and/or local relationship to the scene shot, for example, as a viewpoint onto a scene image and/or a view endpoint or a view direction in a 3D scene. These view data can be captured and supplied by a mobile eye tracker, for example, an eye tracker that can be worn on the head, or even by a remote eye tracker that is not head-mounted but attached, for example, to a display device, such as a monitor. This is particularly advantageous when the scene shot represents a display shown on the display device so that the view of the user in relation to the display can be captured in a particularly simple manner by the remote eye tracker. The scene shot then, for example, no longer shows the direct field of view of the user (which changes with movements of the head) but can directly show the presented stimulus, which can in turn represent an image, a video, a stereoscopic video, a rendered 3D scene with objects or even as a composition in the AR case. Furthermore, a plurality of (or even no) viewpoints and/or view directions can also be assigned to a scene shot. For example, the image recording rate at which the scene shots are taken can be less than the acquisition rate at which the eye tracker records the view data, so that a plurality of individual viewpoints and/or view directions were recorded for a particular scene shot within a specific recording time interval. All of these viewpoints and/or view directions recorded in this scene recording time interval can then be assigned to the scene shot in question. Similarly, the image recording rate may be greater than the acquisition rate at which the eye tracker records the view data. If a plurality of viewpoints and/or view directions are assigned to a scene shot (such as a scene image), then all view data or representative view data/datum (median, mean value, other representation) can be assigned to a scene shot.

The reference can also be present in many different forms. For example, the reference can be a local representation, such as an image or a static 3D scene, a local-temporal representation, such as a video or a dynamic 3D scene, or a content-based/semantic representation, such as categories/classes of objects acquired as a data structure, or, for example, as a visual or as a three-dimensional representation of specific or prototypical objects.

Such a reference can also have been extracted from a scene shot or from one of the scene shots. A reference may furthermore be a local, temporal or local-temporal portion of a scene shot. A reference can have been created in its particular form (as listed above for scene shots) using external means, and thus independently of an eye tracker.

Furthermore, the view image, which represents the imaging of a view direction and/or of a view endpoint or of a viewpoint of a scene shot onto the reference, can be determined manually or automatically. Furthermore, the view image can be determined for each discrete time recording of a scene shot, for example, image by image of an image sequence, or for a time interval. The time interval can, for example, correspond to a view event, such as a fixation.

In this respect, the at least one quality measurement can be predefined or dynamically determinable. For example, the at least one quality measurement can be determined as a function of one or more criteria and/or can be selected from a plurality thereof by a user.

The viewpoint imaged onto the reference and/or the imaged view direction can, for example, represent the result of the view image. However, even an imaging of such a viewpoint which has not been carried out or is missing can be regarded as the result of the view image.

According to one embodiment of the invention, it can be provided that the result of the evaluation is displayed to a user. For example, after one or more view images have been produced, the reference image together with the imaged viewpoints can be displayed on a display device, wherein the individual imaged viewpoints are displayed in different colors depending on their quality as evaluated in accordance with the at least one quality measurement, for example, high-quality viewpoints in green, low-quality viewpoints in red.

According to a further advantageous embodiment of the invention, it is provided that the at least one view image is assigned to at least one of a plurality of defined quality classes depending on the evaluation on the basis of the at least one quality measurement. For example, a view image can be assigned via a threshold value, for example, to the quality class of 'successful' or 'no review necessary' or even to the quality class of 'to be reviewed/possibly corrected.' It is also possible, for example, to evaluate with a quality measurement whether a view direction image or a view image should have been produced in a scene image and this view image is however missing, so that such a view image can be assigned to the quality class of 'missing/possibly to be reviewed/image possibly to be determined manually.' The result of the quality class assignment can in turn be provided and, for example, visualized for a user or output in a different way. For example, the viewpoints can in turn be displayed on the reference with a color corresponding to their quality class assignment. The quality class assignment can however be communicated to a user in any other way, e.g., as a visualization in the form of a histogram, which illustrates the numbers of view images assigned to the respective quality classes. The quality classes can be represented on a display device as appropriate icons or menu items, with corresponding names or designations, such as 'to be revised,' for example. By selection of such a menu item, the view images assigned to this quality class can then be visualized. In addition, two or three or four or any number of quality classes can be defined, so that a particularly differentiated evaluation and examination of the results of view images is made possible. Furthermore, an algorithm selection may, for example, also be made depending on the quality classes, as described in the simultaneous application of the same applicant entitled 'Method and device for creating a view image,' filed on the same filing date. Accordingly, the evaluation of the view image can be used to create a new view image in order to improve the quality, this being done on the basis of an algorithm or at least a part of an algorithm which was selected in dependence on the quality class of the view image in question. In this way, the quality classes can also be used to recreate assigned view images using different algorithms and thus improve their quality directly, and/or to determine or to influence the type of algorithms to be used.

The classification into quality classes also advantageously makes it possible to carry out an overall evaluation of a view image using different quality measurements. For example, a view image can be assigned a first quality value in accordance with a first quality measurement, a second quality value in accordance with a second quality measurement, a third quality value in accordance with a third quality measurement, and so on. A mean value, e.g., even a weighted mean value, can be formed from the assigned quality values, wherein the quality values of the individual quality measurements can be given different weightings. The view image can then be assigned to one of the quality classes corresponding to this mean value. This advantageously makes possible an assignment of the view image to one of the quality classes while taking into account various aspects of the quality evaluation.

Such aspects, which are evaluated by the quality measurements, are, for example, the image quality, the image similarity of the environment of the viewpoint in the scene image and in the reference, the extent to which the content of scene images matches the reference in general or even the matching of the reference and the real scene, and many more. Furthermore, different quality class types can also be envisaged, wherein a particular quality class type covers a plurality of quality classes. In this respect, a particular quality class type can be assigned to a quality measurement so that a view image is evaluated in accordance with a first quality measurement and is assigned to a quality class of the first quality class type in accordance with the evaluation, while the view image is in addition evaluated in accordance with a second quality measurement and, depending on the result of the evaluation, is assigned to a quality class of a second quality class type, and so on.

Furthermore, the provision of the at least one scene shot with the assigned viewpoint and/or view direction and the provision of the reference with the result of the view image can be effected as provision of input data, comprise data relating to the at least one scene shot, data relating to the particular viewpoint and/or the particular view direction and data relating to the reference as well as data relating to the result of the view image, and these input data or at least part of them can be used for evaluation.

For this reason, in a further particularly advantageous embodiment of the invention, the evaluation of the at least one view image by means of at least one predefined quality measurement is carried out in dependence on an analysis of the at least one scene shot and/or the at least one assigned viewpoint and/or the at least one assigned view direction and/or the reference and/or the result of the at least one view image. On the basis of these input data or at least parts thereof, the above-described aspects to be evaluated in accordance with the quality measurement can advantageously be supplied.

The provision of the at least one scene shot with the at least one assigned viewpoint and/or the at least one assigned view direction and also the provision of the reference together with a result of the at least one view image can in this case also be effected in a chronological sequence, e.g., in a streaming process, so that the data of the at least one scene shot are, for example, received sequentially over time and thereby made available. The same also applies to the data concerning the reference, the view data and the result of the view image. In this case, an analysis of at least parts of these data in order to evaluate the view image can already begin before all of these input data have been received. For example, the sequentially received data of a scene shot can be analyzed immediately after the data are received even if not all of the data concerning this scene shot have yet been received. Neither do all of the data necessarily have to be used for the analysis. Even on the basis of a part of the received data, results or intermediate results can be provided which can be used for further processing, without all of the data necessarily having to be received and analyzed. In this way, results or partial results may be available during processing, in particular even of multiple scene shots, before all of the data, such as those of a single scene shot or of multiple scene shots, have been received.

The assignment to a quality class on the basis of the evaluation in accordance with the at least one quality measurement can in this case be carried out by means of a threshold value method. In other words, if the quality value assigned to the view image in accordance with the at least one quality measurement, or even the mean value or the value formed from a plurality of quality values, falls within a particular range of values which is limited by one or more threshold values and which has been assigned to a quality class, the view image will be assigned to this quality class. The decision regarding the quality class assignment can however be made not only on the basis of a threshold value decision, but any classification methods can be considered. In addition to the threshold value decision, suitable classification methods using a model also include, for example, a decision tree, Bayesian classification, logistic regression, a support vector machine, artificial neural networks and/or other methods delivering model-based decisions. In addition, so-called classification methods without a model or unsupervised learning methods can be applied for this purpose, such as clustering techniques (for example, k-means clustering, mean-shift clustering, spectral clustering, affinity propagation, biclustering, hierarchical clustering, and so on), latent variables models, unsupervised artificial neural networks, unsupervised support vector machines, outlier/novelty detection, matrix factorization (for example, PCA, ICA, NMF, LDA), non-linear dimension reduction (for example, NLDR, manifold learning), or unsupervised linear/Gaussian mixed models. Any combinations thereof can also be used.

In a further advantageous embodiment of the invention, at least one predefined action with respect to the at least one viewpoint and/or the at least one view direction is performed in dependence upon the evaluation. Such an action, for example the one described above, can represent a visualization of the viewpoints and/or view directions, for example, with respect to the reference, in which the quality assigned to the viewpoints according to the evaluation is identified visually. Such an action can however also be the issue of a notification to the user that the view images rated as poor should be reviewed or processed manually. Another first action of this kind can also be the deletion or removal of view images rated as poor or viewpoints rated as poor from subsequent processing steps. In addition, there are many other possibilities for such a first action. The first action can furthermore be carried out not only in dependence upon the evaluation but also, for example, in dependence upon the quality class to which the view image of the respective viewpoints and/or view directions have been assigned. Accordingly, the evaluation-dependent execution of an action with respect to the viewpoints or view directions on the whole allows not only detailed and differentiated information about the results of the evaluation to be output to the user but also recommendations for further processing, up to and including the automatic evaluation-dependent further processing of the viewpoints themselves.

In a further advantageous embodiment of the invention, a plurality of scene shots with their respectively assigned viewpoints and/or view directions are provided as the at least one scene shot, and a plurality of view images for imaging the respective viewpoints and/or view directions onto the reference are evaluated by means of the at least one specified quality measurement. This embodiment is particularly advantageous, since an enormous time saving and a reduction in effort are achieved with the invention and its embodiments, especially in the case of numerous scene shots with numerous corresponding view data and corresponding view images. In addition, the invention and its embodiments are particularly suitable for applications in which numerous scene shots and view data have to be evaluated. In this case, the respective view images do not necessarily have to be evaluated by means of the same quality measurement or quality measurements, but the evaluation of a particular view image can also be performed by means of different quality measurements. For example, the quality of view images from different experiments or specific analysis time intervals can, for example, be investigated from different aspects, which advantageously permits many flexible options for adaptation to different situations and applications.

In a further advantageous embodiment of the invention, metadata are assigned to the at least one viewpoint and/or to the at least one view direction and/or to the at least one scene shot and/or the reference. Such metadata represent data going beyond the pure viewpoint data and image data of the scene shot or of the reference, which provide additional information on the viewpoint data and/or the scene shot data and/or the reference data. These metadata can also be provided as part of the input data. For example, an acquisition time can be assigned to a particular viewpoint. In the same way, this can also be the case for a particular scene shot. Such metadata may also relate to the tagging of individual viewpoint shots or scene shots or the reference. Such metadata may also concern the properties of one or more persons, objects or things involved in the scene shot, such as gender, temperature, membership of a test group, and so on. Such metadata can also concern additionally recorded data, such as audio data, EEG data or pulse rate measurements of the at least one person. Metadata of this kind can also be included in the quality evaluation of a particular view image, thus representing a further advantageous embodiment of the invention, if the evaluation of the at least one view image is carried out as a function of the metadata by means of the at least one predefined quality measurement. The metadata or parts thereof can also be used to determine the first action which is then carried out in dependence upon the evaluation. It is also particularly advantageous to use such metadata, for example, to make a selection, as will be explained in more detail below.

According to a further advantageous embodiment of the invention, at least one selection of viewpoints and/or view directions of the plurality of viewpoints and/or view directions is made, wherein at least one predefined second action for the selected viewpoints and/or view directions is carried out, in particular wherein the at least one selection is made in dependence upon the quality classes and/or the at least one quality measurement and/or the first action and/or a result of the execution of the first action. Such a selection can also advantageously be made in dependence upon the described metadata. The second action also can, correspondingly to the above-described first action, include a visualization of the results of the view images, with the corresponding viewpoints once again being color-coded on the basis of their quality, for example. However, according to this exemplary embodiment, not all of the viewpoints are now visualized but only those which were selected according to the selection. Several such selections can also be made and the corresponding actions with these selections can also be carried out.

Such a selection can now be made according to various criteria. For example, in this way, only the viewpoints and/or view directions of a specific test period or acquisition period can be selected or only the viewpoints of a particular person or group of persons, or of persons of a particular gender, or similar. To make such a selection, the metadata described above can now advantageously be used. Such a selection can however also be made in dependence upon the quality measurements or quality classes. If, for example, a view image is evaluated by means of several different quality measurements, such a selection can also specify that only those viewpoints are displayed which were rated as especially good according to a first quality measurement, or even only those viewpoints which were rated as especially good according to the second quality measurement. In this way, individual actions can be performed selectively in dependence upon those aspects of the quality of the view images which were specified by the quality measurements in question. This has the great advantage that particularly good possibilities for adaptation to individual applications and the most diverse situations are also given as a result. For example, there may be applications for which only some aspects of the quality of a view image are relevant to the final result but other aspects of the quality evaluation are not. The selection now advantageously makes it possible to select viewpoints subsequently on the basis of different aspects of quality, and accordingly to perform the second action only for the selected viewpoints and/or view directions. The selection can accordingly also be made in dependence upon the quality classes. For example, only the viewpoints of a particular quality class can be selected for further processing as a second action and/or viewpoints of a different quality class can be discarded or deleted as another example of such a second action. In addition, the selection can also be made in dependence upon the first action and/or a result of an execution of the first action. For example, the first action may concern the calculation of a total reliability of the overall result of the viewpoint images. If this reliability, for example, does not meet the desired criteria, viewpoints rated as poor can be removed, ignored or deleted when providing the overall result according to the selection, and, accordingly, the reliability of the overall result can be recalculated on the basis of the selected viewpoints and a check can be carried out to see whether the desired criteria regarding the overall reliability are now met. In this way, numerous advantageous possibilities are provided for selecting viewpoints from the totality of all viewpoints and/or view directions, and further processing them suitably. Such selections can be effected on the one hand in terms of the quality of the respective view images but on the other hand according to any other criteria, which is made possible, for example, by the metadata. Users themselves can, for example, also specify criteria for the selection or can select from a plurality of predefined criteria such criteria that the selection is ultimately made as a function of the criterion selected by the user. In other words, users can thus make selections such that only those viewpoints evaluated in accordance with a particular quality measurement are to be displayed, and then those viewpoints evaluated in accordance with a further quality measurement, or only the viewpoints of a specific test group, or the like. Selections can also be made fully automatically in accordance with specified criteria or rules.

In a further advantageous embodiment of the invention, at least one sequence is specified, which concerns the various quality classes and/or the various selections of viewpoints and/or view directions and/or the viewpoints and/or view directions within a quality class and/or the viewpoints and/or view directions within a selection, and a third action is executed for the viewpoints and/or view directions as a function of this sequence. For example, it may be provided that the various quality classes are specified in a certain order, and, in the case of an evaluation of the result of the view images, the view images assigned to a first quality class are first used for the evaluation, and if, for example, the result has an uncertainty that is still too high on account of the insufficient quantity of data, the viewpoints of a second quality class are then also used for evaluation, and so on. A sequence within a quality class can also be defined, for example, corresponding to the ratings given to the view images within a quality class according to their respective quality. In this way, those view images rated within a quality class as better can be used first for the third action, for example, a further processing step for the view images, then those rated as middling, and so on. The sequence within a quality class can however be defined not only according to the rated quality, but such a sequence may also represent a chronological order corresponding to the acquisition timepoints of the viewpoints and/or scene shots, or a sequence relating to different persons or groups of persons, gender, or the like. Metadata can also be used accordingly to define such a sequence or the sequence definition can be made as a function of the metadata. Such a sequence can also be made in dependence upon the quality measurements, for example, if the evaluation of the view image is made in dependence upon several quality measurements by means of several quality measurements, the sequence can take into consideration an appropriate weighting or prioritization of some quality measurements with respect to other quality measurements.

Such a sequence can also be configured between different selections. If specific viewpoints were selected in accordance with a first selection, and additional viewpoints were selected to correspond to a second selection based on second criteria, a sequence can also be defined for these selections in order to subsequently carry out the third action in dependence upon this sequence. Sequences for viewpoints and/or view directions within such a selection can also in turn be defined correspondingly. In other words, such a sequence can be set up according to various criteria or depending on various parameters which can, for example, also be selectable by a user. The user can therefore, for example, have the results of the view images visualized, wherein the results of a test on the current day is displayed first, and then the results of a test on the previous day, and so on.

An overall result can also be visualized first, then the test results of a first age class, then the test results of a second age class of persons, and so on. The user can also be given a recommendation or an information message about view images to be reviewed and/or revised, wherein this recommendation is output first for view images which have been rated as comparatively good, then for view images which have been rated as middling, then for view images which have been rated as poor. This too can be carried out separately for a first age class, for a second age class, for a first test day, for a second test day, for a gender, for a first test scenario, and so on. In this way, particularly flexible further processing options are provided, which can be used in a manner particularly adapted to individual situations.

The decision regarding the sequence can in turn be dependent on previously obtained results, such as also, for example, on the first action, the second action or their results. The assignment of a view image to a quality class thus depends, for example, on the evaluation via the quality measurement. The decision about which first action is to be performed again depends on the evaluation via the quality measurement or on the quality class. A selection of viewpoints and/or view directions can in turn depend on their evaluation, on the quality class or on the first action or its result. Furthermore, sequences can be defined, such as the external sequence between the quality classes or selections, as well as the internal sequence within quality classes or selections, which can in turn depend on the evaluation via the quality measurement itself, on the quality class, on the first action and/or on the selection. An internal sequence can also be defined, and then an external sequence, which in turn depends on the internal sequence. The third action can in turn be performed in dependence upon the sequences, wherein the third action itself may in turn be dependent on the quality measurement, the quality class, the first or second action, or the selection. In other words, for a next decision about, for example, the first action, the selection, sequences and so on, it is possible to use all previously accumulated and collected information and data, results and decisions already taken. Decisions of this kind can however also be influenced by further criteria, regardless of those mentioned above, or even depend on them completely or additionally. In this case, such criteria can be provided, for example, by the metadata described.

For this reason, it is an advantageous embodiment of the invention that the evaluation and/or the assignment to a quality class and/or the first action and/or the at least one selection and/or the sequence and/or the second action and/or the third action is determined in dependence upon at least one criterion, in particular in dependence upon the assigned metadata, for example, upon the acquisition timepoint assigned to a particular viewpoint and/or a particular view direction. This means that the evaluation of the view images by means of the quality measurement can, for example, also be additionally dependent on such metadata. These metadata can, for example, decide which of several quality measurements are to be used for the evaluation of the view image or also which aspect of the quality of the view images is relevant to a result and is therefore to be assessed. For example, after a tagging with regard to the current application area, the metadata can be used to search for relevant objects during the test, or similar. In some tests, it may only be relevant to determine the object a person is looking at, wherein it is irrelevant which part of this object the person is precisely looking at. In other tests, however, it may be relevant to also determine exactly what part of an object a person is looking at. Small deviations of the imaged viewpoint from the actual position can already lead to the imaged viewpoint no longer lying on the correct object, while it is also possible on the other hand for the imaged viewpoint nevertheless to be lying on the correct object despite greater deviations from the actual viewpoint. Whether the magnitude of the deviation of the imaged viewpoint from the actual position is a suitable criterion for assessing quality depends under certain circumstances on the situation or on the objective of a test. If it can, for example, be deduced from the metadata that a very specific target object is relevant in the experiment, a quality measurement can be used which assesses whether the viewpoints lying on particular objects in the scene shots were also imaged onto the corresponding objects in the reference, regardless of whether these were also imaged onto the correct area of such an object. In other cases, however, a quality measurement can be selected which assesses the quality of the view images with regard to whether the viewpoint was also imaged onto the correct area of an object. Metadata can thus also be used advantageously for laying down criteria for the assessment of the quality of the view image and selecting appropriate quality measurements for assessing the quality of the view images. Metadata can also be used accordingly for defining a sequence, for example, for different groups of people, or a chronological sequence, in order to define a selection or even to decide about various actions, such as the first, the second and/or the third action, which are to be applied to a particular quality class, selection, or sequence.

Assessment or evaluation of the view images by means of one or more quality measurements thus advantageously makes possible an objectification of the assessment of the quality while taking into consideration different situations, objectives and/or prespecifiable aspects of the quality. This advantageously makes it possible to state an overall reliability of the ultimately provided overall result of the view images with regard to the aspects of quality relevant to the particular application case.

Various possible quality measurements are explained in more detail below. As described at the beginning, at least a part of the input data is used to evaluate the view images since, above all, the comparison between the positions of the viewpoints and/or view directions in a particular scene shot contains the most information about the quality of the view image as compared with the result of the view image on the reference. However, there are also aspects of the quality which can, for example, be measured solely with the aid of the scene shots, such as the image quality, for example. There are also aspects of quality which can be measured completely independently of the scene shots and the reference, such as the number of viewpoints present in relation to scene shots in comparison with the number of imaged viewpoints or the number of unimaged and therefore missing viewpoints.

According to an advantageous embodiment of the invention, a degree to which the content of the reference matches the at least one part of the scene and/or the content of the at least one scene shot matches the at least one part of the scene is evaluated in accordance with the at least one quality measurement. There are situations in which a reference is provided first, for example, in the form of a schematic drawing or diagram or even in the form of a computer-aided design, which is then to be recreated or reproduced as a real scene. In such a case, there may be deviations between the real scene and the reference; for example, it may happen that objects in the real scene do not have the same distances or positions relative to each other as in the reference. This can in turn lead to incorrect images of viewpoints on the reference in relation to the scene shots. In order to determine whether and how well the reference matches the scene, the content of the reference can, for example, be compared with the content of the scene shots. If groups of objects are in a configuration in the scene shots which differs from that in the reference, it can, for example, be assumed that the reference deviates from the real scene. Even the extent of such deviations can be quantified by means of image analysis methods.

This quantification can be provided for a particular view image as a quality value based on the quality measurement measuring the extent to which the content of the reference matches the at least one part of the scene. The situation is similar for the quality measurement for evaluating an extent to which the content of the at least one scene shot matches the at least one part of the scene. During a test, it may happen that a person becomes distracted and is therefore not looking at the relevant scene but rather, for example, at the floor, at other people, out of the window or the like. In the case of a head-mounted scene camera, this results in such scene shots not including any parts of the actually relevant scene. Such discrepancies between a scene shot and the at least one part of the scene can also be easily determined by image analysis methods. To this end, the scene shots are, for example, compared with each other and also with the reference. If there is a content match between the reference and other scene shots, for example, it can be assumed that this content match represents the relevant scene. If some of the scene shots do not have this content match, or only partially, it can be inferred from this that there is a deviation of the content match of the at least one scene shot from the at least one part of the scene. This deviation can also in turn be quantified by the quality measurement and provided as a corresponding quality value for the view image of the viewpoint provided in relation to this scene shot. If, for example, there is no content match between the scene shot and the relevant scene, there will also not be any content match with the reference either. It will therefore not be possible to image onto the reference a viewpoint provided in relation to this scene shot. If this viewpoint is finally classified as a missing viewpoint or missing view image, this view image can be assigned in particular to the quality class 'not imaged, correct.' If, on the other hand, there is a content match between the scene shot and the reference, especially in the area of the viewpoint in relation to the scene shot, and if such a viewpoint is nevertheless not imaged, such a view image can, for example, be classified as 'not imaged by mistake/manual correction necessary.'

According to a further advantageous embodiment of the invention, a similarity is evaluated on the basis of the at least one quality measurement between a first predefined image area, which can in particular be a 2D image area or also a 3D image area, around the viewpoint assigned to the at least one scene shot and/or the view direction in the at least one scene shot and a second predefined image area, which can also be a 2D image area or also a 3D image area, around the corresponding imaged viewpoint and/or the view direction in the reference. The first and second predefined image areas in this case represent only a partial area of the overall image of the scene shot and the reference. This has the great advantage that in the case of a check of such a local content match, all of the images of the scene shot and the reference do not need to be examined and analyzed. This can save an enormous amount of computing power and time. In this case, it is above all the local match between the areas around the viewpoint in the scene shot and around the imaged viewpoint in the reference which is particularly suitable for making a statement about the accuracy of the view image and thus about its quality. This similarity can in turn also be quantified by the quality measurement and a corresponding quality value can be assigned to the view image. The better the match between these local image areas, that is, between the first predefined image area and the second predefined image area, the higher the quality can be rated and, correspondingly, the higher the quality value can turn out.

There are various ways of determining this similarity between the first and second predefined image areas. Accordingly, different quality measurements can also be used for the evaluation of this similarity.

For this reason, it is an advantageous embodiment of the invention that the evaluation is carried out in accordance with the at least one quality measurement, in particular the evaluation of the similarity and/or match between the first and the second predefined image areas, based on a brightness and/or color comparison and/or comparison of edges and/or object comparison of detected objects and/or gradient comparison in terms of a color gradient and/or brightness gradient and/or contrast gradient. A similarity comparison or the determination of the degree to which the two image areas match can in this case generally be carried out on the basis of known and well-established image analysis methods and/or content analysis methods. Some other examples of such methods are the assignment of extracted image features (statistical description, for example, with the histogram of the properties of color, brightness, edges, and so on around a location), such as point features, and/or the consideration of disparity, curve, gradient; depth(s), curve, gradient; contrast, curve, gradient; texture properties; frequency analysis and/or spectral decompositions (wavelet, DFT, and so on).

The evaluation of similarity can also be carried out on the basis of all these criteria mentioned, wherein each of these criteria defines a corresponding quality measurement. In order to define a corresponding quality measurement, it is also possible to select only one sub-group of these criteria mentioned. A single quality measurement can also be provided, which is used to assess the quality value of all these named criteria for evaluating similarity. One key aspect of quality is above all how well a scene image is imaged locally onto the reference image and how this image of the scene image differs, for example, in the brightness values of the viewpoints, from the relevant portion of the reference, that is, the portion of the reference image which includes the imaged viewpoint. A view image (such as a projective transformation) can thus be applied to the associated scene image and the pixel difference can be calculated as a 2D sum of the absolute difference between the brightness values of the individual viewpoints of the projected scene image and of the reference image. Another quality measurement describes, for example, the edge structure in a projected scene image and compares it with the edge structure of the reference. Another quality measurement can use object detection and/or object recognition in order to evaluate and/or compare in a scene shot and in a reference the similarity of the objects found and/or located in the vicinity of the original and of the imaged viewpoint and/or view direction. Another quality measurement can evaluate a view direction image or view image on the basis of the intensity of the movement between scene images for a particular assignable view direction image. As a result, numerous advantageous possibilities are provided for evaluating the quality of a view image.

A fundamental problem with the restriction to a local analysis area around the viewpoint and the imaged viewpoint is however that with a local matching of the scene shot and the reference, it cannot necessarily be assumed that the viewpoint in relation to the scene shot was also correctly imaged onto the reference. In studies relating to shelves, for example, in which a shelf is holding many similar or identical objects, such as in the case of a supermarket shelf with a plurality of identical products arranged alongside each other, a restriction to a local area which has been dimensioned too small can under certain circumstances not be adequate for evaluating the quality of the view image. If, for example, several identical bottles are arranged on a shelf and the person is looking at one of them, and if now the viewpoint is imaged onto one of these bottles in the reference, it may be the case that a local comparison between the scene image segment and the reference segment around the viewpoint in question results in a match but that the viewpoint was nonetheless imaged onto this one of these several bottles. It can thus under certain circumstances be very advantageous to consider a larger area around the viewpoint in the scene image and the imaged viewpoint in the reference in order to exclude such mix-ups. However, an enlargement of the first and/or second areas does in turn mean more computational effort.

For this reason, a particularly advantageous embodiment of the invention is when the first and/or second predefined image areas are defined in accordance with at least one predefined criterion, in particular in dependence upon a user input and/or a specified minimum accuracy and/or an intermediate result of the evaluation of the similarity and/or an image analysis of the scene shot and/or of the reference and/or as a function of the metadata. This advantageously permits the size of the predefined first and second image areas to be selected to suit the situation. Thus, on the one hand, this choice can be left to the user himself, who is aware, for example, that such mix-ups can happen in the present experiment or then again maybe not. Furthermore, a minimum accuracy or minimum reliability can also be specified for the evaluation. If, for example, a very low reliability is selected for the evaluation, the first and/or second predefined areas can be selected smaller while if, on the other hand, a higher minimum accuracy is required, the first and/or second predefined areas can be selected larger. It is also particularly advantageous to select the size of the predefined image areas in dependence upon an intermediate result of the evaluation of similarity and/or an image analysis of the scene shot and/or the reference. If, for example, the evaluation of similarity on the basis of a very small first and/or second predefined image area reveals that they match, the evaluation of similarity on the basis of a larger selected first and/or second predefined image area can additionally be examined in order to verify the result. If, on the other hand, it is already determined on the basis of the comparison of the first and/or second predefined image areas which were selected to be very small that they do not match, a further comparison or check for similarity using a larger selected image area can be dispensed with. An image analysis of the scene shot and/or the reference is also helpful in selecting the size of the predefined image areas. For example, a single scene shot and/or the reference can be examined to see whether the scene includes any similar objects with which there is a likelihood of mix-ups. If this is not the case, the first and/or second predefined image areas can be selected smaller for the evaluation of the view image. Knowledge of whether similar objects are present in the scene can advantageously be obtained from an analysis of a very small number of scene shots and/or the reference. This information can also be obtained from metadata in the same way. If these metadata, for example, due to tagging, provide information about the test scenario, such as by the tag 'shelf study,' this information can be used to suitably choose the first and/or second predefined image areas. In the case of a shelf study, for example, it is to be assumed that the scene in question has several similar objects. However, in a study of human interaction, it can however be assumed that due to the individuality of the appearance of persons, there is no risk of such confusion and, accordingly, the first and/or second predefined image areas can be selected smaller.

In the same way, it is also advantageous, for example, to define the described quality measurement for evaluating similarity in dependence upon this predefined criterion or the predefined criteria described above. If, for example, there is no risk of confusion between objects, similarity can be evaluated on the basis of a brightness and/or color comparison of the predefined image areas. Such a brightness and/or color comparison represents a particularly simple and time-efficient way of making a comparison. If, on the other hand, there is a risk of confusion, as an alternative or addition to this brightness and/or color comparison, an edge comparison and/or an object comparison of detected objects, for example also with regard to their positions relative to each other, can be used for the evaluation, which correspondingly significantly increases the reliability of the evaluation.

Through these measures, not only the first and/or second image areas but also the quality measurements to be used for the evaluation can advantageously be selected to suit the situation in question so that, despite the localization problem, a sufficiently high reliability can always be provided without having to select the predefined image areas unnecessarily large, whereby an enormous time saving can in turn be achieved.

According to a further embodiment of the invention, a presence or absence of imaged viewpoints and/or view directions is evaluated in accordance with the at least one quality measurement. If, for example, a very great number of view directions and/or viewpoints were not imaged, it can also be concluded that the overall result of the view images is to be rated overall as relatively poor. In this case, there are also more possibilities for differentiation, namely whether the lack of viewpoints is due to the fact that viewpoints could not be imaged because there are no corresponding objects between scene shot and reference, or whether corresponding objects were merely not detected by mistake.

According to a further embodiment of the invention, a statistical variable determined from the viewpoints and/or view directions in relation to the scene shots and/or the imaged viewpoints and/or view directions is evaluated in accordance with the at least one quality measurement. For example, in this regard, the distribution of the viewpoints imaged onto the reference can be examined and a quality of individual and also of the totality of imaged viewpoints can be derived therefrom. For example, a marked scattering of the imaged viewpoints may indicate a poor image quality. If most of the imaged viewpoints are concentrated in a particular section of the reference image and only a few imaged viewpoints fall outside this section, these aberrant viewpoints can be classified as outliers or rated with a low quality value. Statistical intermediate steps or other image and signal processing steps can also be used for evaluating quality and defining a corresponding quality measurement, and thus also transformations, partial statistics, correlations and so on, and combinations thereof.

According to a further advantageous embodiment of the invention, an image quality of the at least one scene shot and/or the reference is evaluated in accordance with the at least one quality measurement. If, for example, the image quality of a scene shot is very poor, for example, due to so-called motion blur, in other words, the smearing or entanglement of such a recording caused by an excessively fast camera movement, it must also correspondingly be assumed that even the position of the viewpoint in this scene can only be determined very imprecisely[, that] object detection techniques do not give good results on the basis of such poor images, and that the imaged viewpoint is also accordingly to be rated as being of a lower quality.

According to a further advantageous embodiment of the invention, the relevance of imaged and/or not imaged viewpoints and/or view directions with regard to a predefined target object or a predefined objective is evaluated in accordance with the at least one quality measurement. If an experiment aims at investigating in respect of a quite specific target object, viewpoints which are not already on the target object in scene shots will not in any case be relevant to the test result. Accordingly, the evaluation of the quality of such view images is also irrelevant to the final result. Accordingly, it is advantageous to provide a quality measurement which evaluates the relevance of such viewpoints with regard to a predefined target object. For example, information about relevant target objects can in turn be derived from metadata, be predefined by a user, or the like. Accordingly, this also applies to a predefined objective which can correspondingly define which target objects or target areas of a scene are relevant and which are not.

In a further advantageous embodiment of the invention, a plurality of different quality measurements is specified for the at least one view image and the assignment of the at least one view image to at least one of the plurality of defined quality classes is carried out in dependence upon the evaluation by means of the plurality of quality measurements. This advantageously makes it possible to quantify different aspects of the quality of a view image by means of the corresponding quality measurements. The use of such different quality measurements is, for example, also advantageous when some aspects of quality are not at all relevant to a particular objective or particular test. However, it is then left up to the user, for example, to make or specify an appropriate selection of viewpoints, a sequence or similar in dependence upon various acquired aspects of quality which were quantified by the corresponding quality measurements. In this way, the results of the view image can ultimately also be visualized under various of these acquired aspects and thereby be made comparable.

Furthermore, the invention concerns a device for evaluating at least one view image for imaging onto a reference at least one viewpoint provided in relation to at least one scene shot of a scene and/or at least one view direction of at least one person provided in relation to the at least one scene shot, said reference having a content match with at least one part of the scene. In this case, the device has an interface, via which the at least one scene shot with the at least one assigned viewpoint and/or the at least one assigned view direction and the reference can be supplied to the device along with a result of the at least one view image. Furthermore, the device comprises an evaluation unit that is designed to evaluate the at least one view image by means of at least one predefined quality measurement and to provide a result of the evaluation.

The advantages mentioned in regard to the method according to the invention and its embodiments apply in the same way to the device according to the invention. In addition, the method steps described in connection with the method according to the invention and its embodiments make possible the further development of the device according to the invention through further concrete features.

The invention also includes a control unit for the device, in particular for the evaluation unit. The control device has a processor unit that is set up to produce an embodiment of the method according to the invention or one of its embodiments. For this purpose, the processor unit can comprise at least one microprocessor and/or at least one microcontroller.

Furthermore, the processor unit can include program code that is configured to produce the embodiment of the method according to the invention when the program code is executed by the processor unit. The program code can be stored in a data memory of the processor unit.

Further features of the invention result from the claims, the figures and the figure description. The features and combinations of features mentioned above in the description and also the features and combinations of features mentioned below in the description of the figures and/or shown only in the figures can be used not only in the combination indicated in each case but also in other combinations without departing from the scope of the invention. Embodiments of the invention which are not explicitly shown and explained in the figures, but which by way of separate combinations of features arise from the described embodiments and can be produced are thus also to be regarded as included and disclosed. Embodiments and combinations of features which thus do not have all the features of an originally formulated independent claim are also to be regarded as disclosed. Embodiments and combinations of features which go beyond or deviate from the combinations of features described in the references of the claims are to be regarded as disclosed, in particular by the above-described embodiments.

Figure 2:
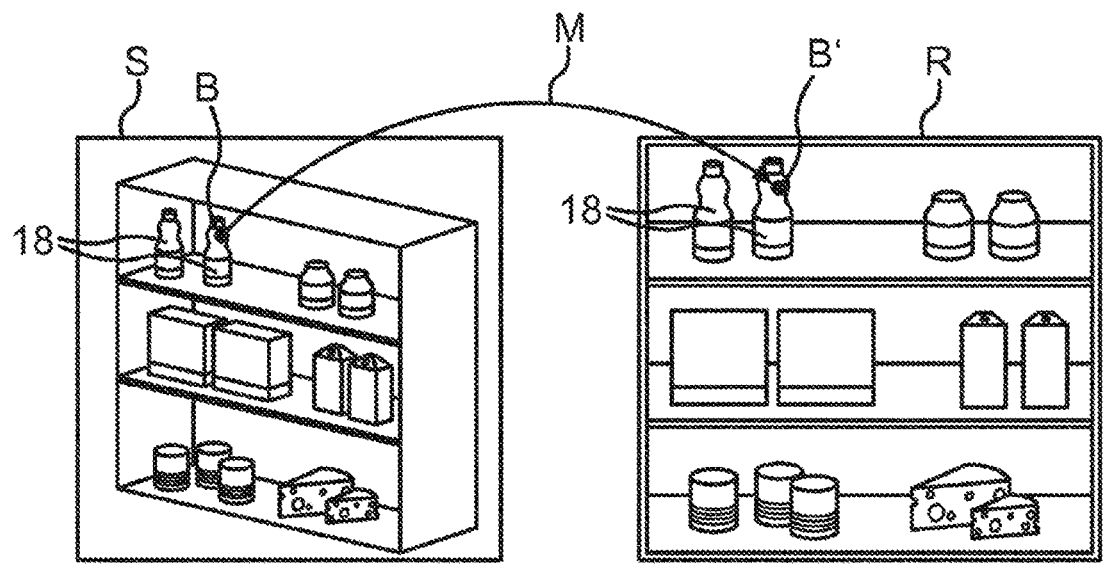
Figure 3:
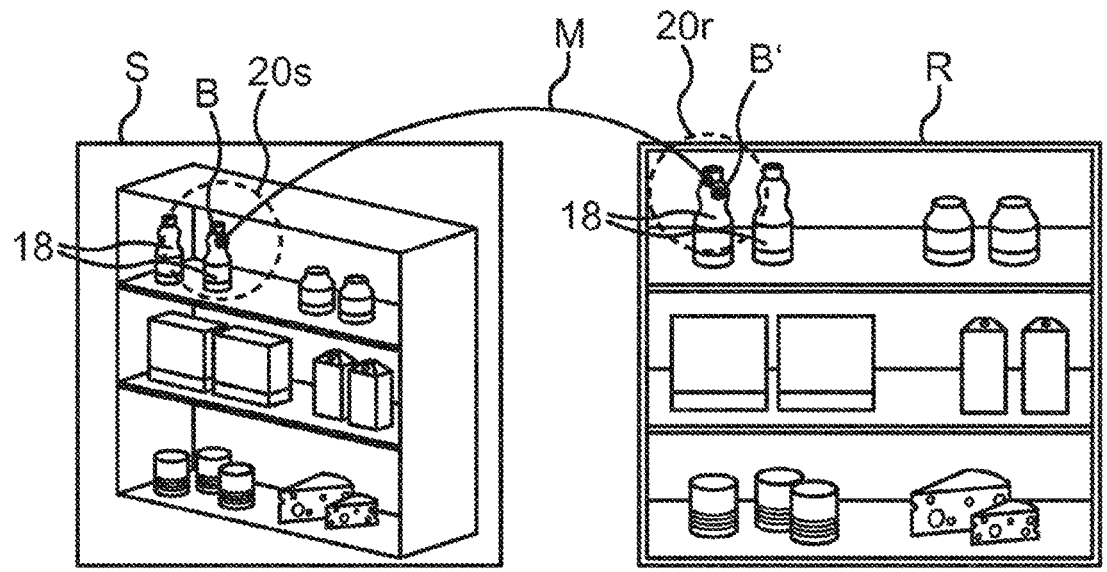
Figure 4:
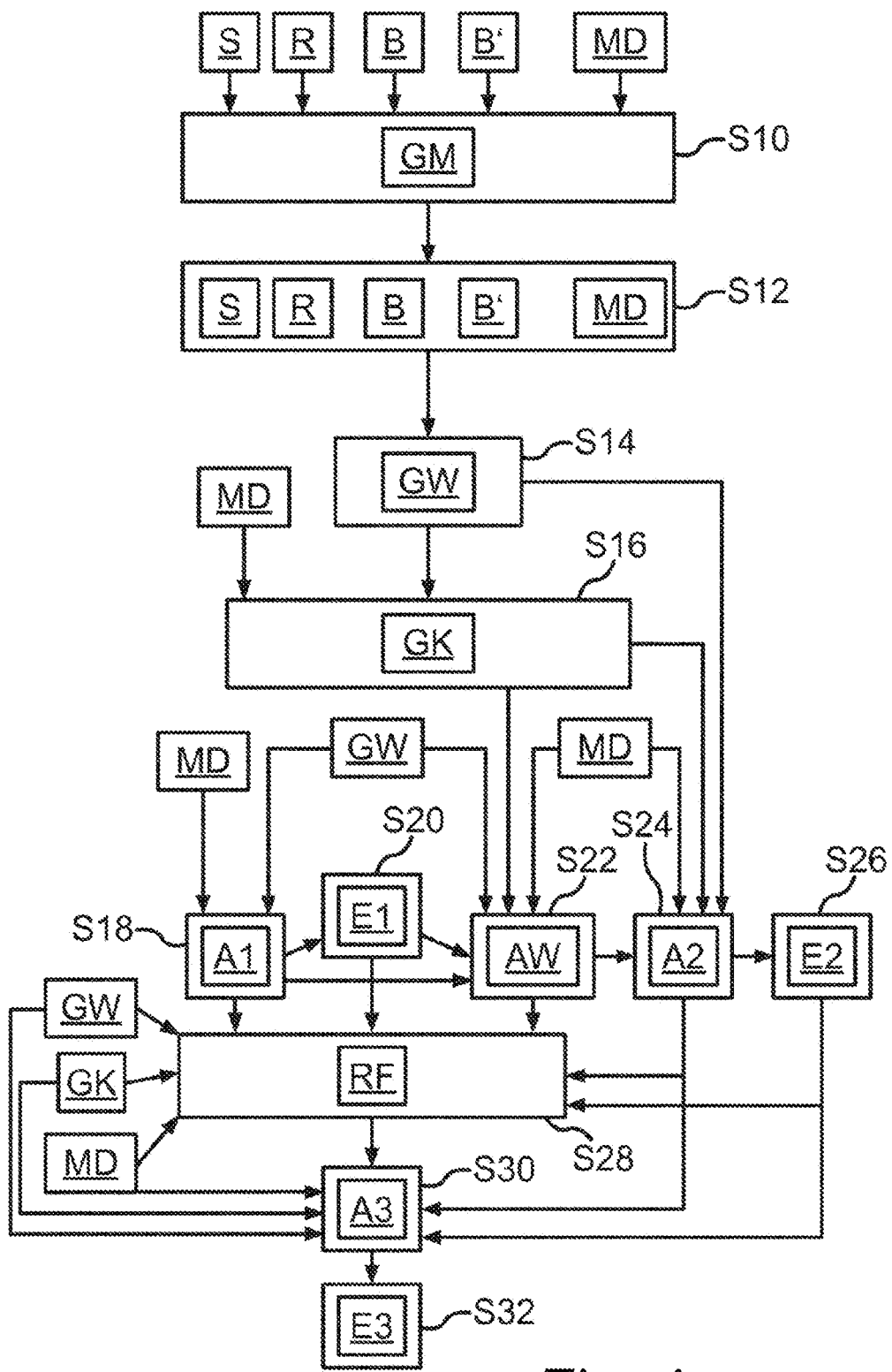
Figure 5:
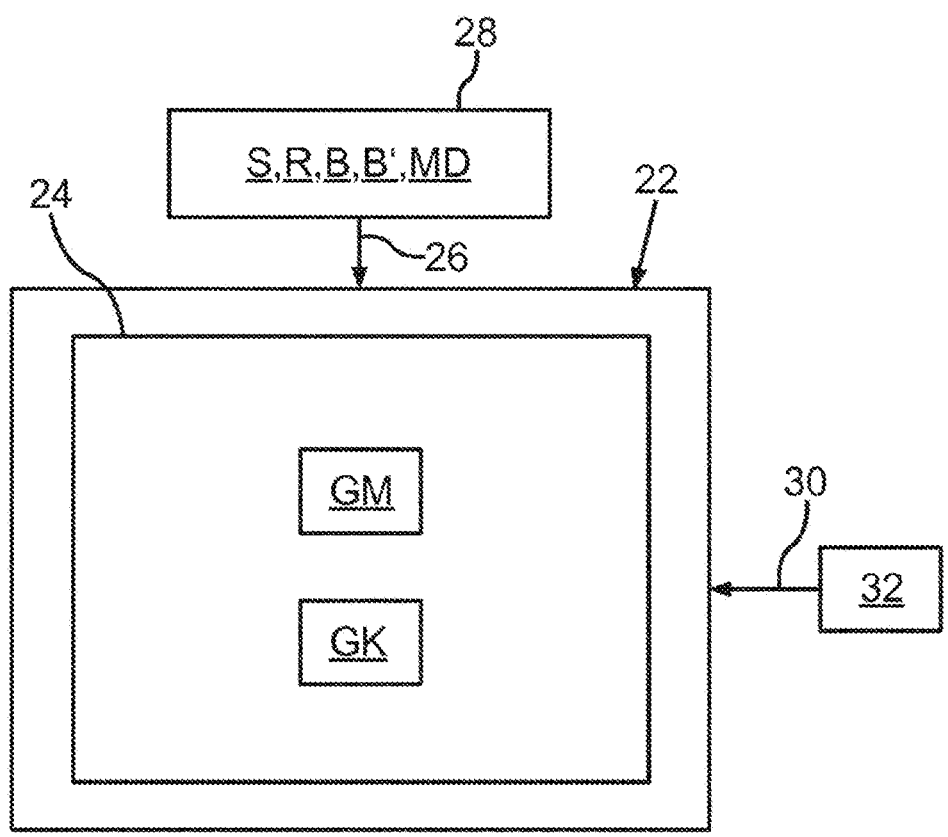

The figures show:

FIG. 1 a schematic representation of a scene and a person viewing the scene;

FIG. 2 a schematic representation of a scene shot with a viewpoint relating to the scene shot and a reference in accordance with an exemplary embodiment of the invention;

FIG. 3 a schematic representation of a scene shot with a viewpoint relating to the scene shot and a reference onto which the viewpoint was incorrectly imaged, in accordance with an exemplary embodiment of the invention;

FIG. 4 a flow chart illustrating a method for producing a view image in accordance with an exemplary embodiment of the invention; and FIG. 5 a schematic representation of a device for evaluating a view image in accordance with an exemplary embodiment of the invention.

The exemplary embodiments described below are preferred embodiments of the invention. In the exemplary embodiments, the components described of the embodiments are in each case individual features of the invention which are to be considered independently of each other, which in each case also develop the invention independently of each other and thus are also, either individually or in a different combination than the shown combination, to be regarded as a constituent part of the invention. Furthermore, the described embodiments can also be supplemented by further features of the invention that have already been described.

In the figures, elements with the same function are designated by the same reference symbols.

FIG. 1 shows a schematic representation of a person 10 who is currently viewing a scene 12. In this case, the person 10 is wearing glasses 14 with an integrated eye tracker which is continuously capturing view data of the person 10, while the person 10 is viewing the scene 12. Furthermore, the glasses 14 have a scene camera 16 which meanwhile is also continuously recording images of the scene 12. In this case, the acquisition of the view data is temporally matched to the acquisition of the scene images or is set or settable in relation to these scene images. For example, the acquisition of particular view data or view directions or viewpoints of the person 10 determined therefrom and the recording of a particular image at a particular time recording can take place synchronously, or the acquisition of the view data and of the image recordings can be provided with a time stamp, so that a particular viewpoint or a particular view direction can in each case be assigned to precisely one scene shot. An example of such a scene shot S is shown in FIG. 2 and FIG. 3.

Here, FIG. 2 shows a schematic representation of a scene shot S of the scene 12 from FIG. 1 with a viewpoint B of the person 10, which was determined on the basis of view data acquired at the time of the scene shot S, as well as with a reference R in order to illustrate a view image in accordance with an exemplary embodiment of the invention. For eye-tracking data, in which view directions and/or view endpoints B are assigned to a time recording of the scene observed by the person 10 observed by the eye tracker, the image of the view directions and/or view endpoints B onto a reference R can be very helpful, e.g., when a plurality of recordings of such eye-tracking data is to be made comparable in relation to a reference R.

The scene shot S here represents an example of a recording of the scene 12 which was made by the scene camera 16 at a specific point in time. Furthermore, a viewpoint B assigned to this scene shot S was calculated on the basis of the view data of the person 10 which were acquired by the eye tracker, said viewpoint B also being shown in the scene shot S. In this example, the reference R also represents an image recording of the scene 12. The reference R can, for example, be one of the scene shots S, a section of one of the scene shots S, or even a separately recorded image of the scene 12, even one such as recorded with a camera other than the scene camera 16 worn by the person 10. According to the view image W, the viewpoint B in relation to the scene shot S is now imaged onto a corresponding viewpoint B' in relation to the reference R. With such a view image M, numerous viewpoints B, which are present in relation to numerous scene shots S, can in particular be imaged onto a common reference R, whereby the comparability of the acquired viewpoint data can be considerably improved, for example. In order to perform such a view image M, certain algorithms may be used. Such an algorithm can, for example, reference the scene shot S to the reference shot R and obtain therefrom, for example, a transformation which images the scene shot S onto the reference R. This transformation so obtained can then be applied to the viewpoint B determined in relation to the scene shot S, correspondingly supplying the corresponding imaged viewpoint B' on the reference R. The referencing between scene shot S and the reference R can, for example, be carried out on the basis of simple image analysis methods. Alternatively or additionally, methods for object detection and/or object classification can also be used.

The scene shot S can in general be available in the most varied forms, for example, as a 2D recording or even as a 3D recording that was recorded, for example, using stereo cameras. It can also be the recording of a purely virtual, for example, computer-generated scene, or also the recording of an AR scene, and so on. The viewpoint data can also be available in the most varied forms, for example, as 2D viewpoints or 3D viewpoints or even as 3D view directions in a 3D scene, and so on. The reference R can also take the most varied forms. For example, the latter may be present in the form of different defined object classes which classify different objects. A first object class can, for example, relate to bottles, a second object class to boxes, a third object class to cans, and so on. In order to produce a view image M on the basis of such a reference R, algorithms that work on the basis of object classifications are especially suitable. For this purpose, for example, the scene shot S can be examined for objects of these object classes and it can be checked to see whether a particular viewpoint B present in relation to such a scene shot S is positioned on an object that is assigned to such an object class. If this is the case, as is illustrated in FIG. 3 for the viewpoint B resting on the bottle 18, this viewpoint B according to the view image M can be assigned accordingly to the first object class for bottles. Such a view image M can also be produced manually by a user himself.

In all of these cases, errors can occur so that the viewpoint B is imaged onto the wrong position in the reference R or even, under certain circumstances, not imaged at all. This is illustrated in FIG. 3.

FIG. 3 shows again the scene shot S as well as the viewpoint B in relation to the scene shot S, and also once again the reference R with the viewpoint B' imaged according to the view image M onto the reference R. In this example, the viewpoint B in the scene shot S was imaged onto the wrong bottle of the bottles 18 in the reference R. Such incorrect images ultimately negatively affect the overall result that is to be obtained on the basis of such view images. However, the bigger problem is that it is not known how reliable the view images are from which the final result was obtained, so that ultimately the reliability of the final result is also unknown.

The inventions and their embodiments now solve this problem advantageously by the quality of the view images M or their result, that is, for example, the imaged viewpoint B', being evaluated in accordance with at least one specified quality measurement. On the basis of such an evaluation, view images can be assigned to a quality class. This advantageously makes it possible to quantify the quality of view images and to ultimately specify therefrom the reliability of a result which was obtained from the view images. In this way, an informative statistical description of the quality of view direction images and viewpoint images is made possible in a simple way for large parts or all view images. Numerous other advantageous applications also become possible due to the assignment to quality classes as well as due to the evaluation itself. For example, only highly rated view images can be used to calculate a result, or the user can be notified of possibly defective view images and check them manually.

Results that may be obtained from such view images are, for example: which object in a scene was viewed most often and which the least; which object first drew the attention of a person and which object did so last or not at all; whether a specific target object was looked at or not; or how often or for how long; whether objects are looked at in a concentrated or focused manner or only fleetingly; and much more. Such observations can then be made in relation to several different persons, and, by means of comparisons, the corresponding findings can be obtained, for example, that a particular object in a scene especially draws the attention of persons in a certain age class while other objects draw the attention of persons in a different age class. Such experiments can also be carried out repeatedly for a single person in order to analyze or investigate, for example, a learning advance or development on the basis of the comparison of the view images for the experiments in question. General fields of application for the present invention and its embodiments are, therefore, generally to be found in the sphere of the evaluation of eye-tracker data, such as the (off-line) post-processing of recordings in order to evaluate and improve the quality of mobile eye-tracking experiments/studies, for instance, for the purposes of research into user friendliness or suitability for use, for development psychology or market research, as well as of remote eye-tracker experiments/studies concerning the measurement of view behavior in the case of varying contents as a stimulus, for instance, internet browsing, UI/application dialogs, usability tests, and also for on-line/use of the quality evaluation or of the eye-tracker data filtered by the quality evaluation for control (as an action), such as the selection of stimuli or the display, further processing, storage of further analysis results which are supported by the view direction imaged.

Numerous different criteria come into consideration in this case as quality measurements for evaluating a view image. By means of the quality measurement, an evaluation is made as to how well the position of the imaged viewpoint or view direction of the person agrees with the actual, real position of the viewpoint or view direction; in other words, the extent of this matching and/or an extent of the matching between the object viewed according to the viewpoint imaged onto the reference and the object actually being looked at by the person. With regard to the above-mentioned variables—in other words the extent—the quality measurement specifies a quality value for a view image, which value represents an estimated value or an approximation for this extent. In particular, different quality measurements can be predefined in this case, which can themselves be predefined in particular by the device 22 (see FIG. 5) for the evaluation of the view image or be dynamically selectable by the device 22 according to predetermined selection criteria, which can also be specifiable by the user himself, and quantify the correspondingly different aspects of the quality of a view image M, that is, of the image of a viewpoint B and/or view direction of a scene shot S on the reference R.

One particularly advantageous and suitable quality measurement is, for example, the similarity between a first predefined image area, such as in the scene shot S the image area 20s (shown here) around the viewpoint B assigned to the scene shot S, and a second predefined image area, such as the image area 20r (shown here) around the corresponding imaged viewpoint B' in the reference R. The similarity between these specific image areas 20s, 20r can be determined according to various criteria, e.g., on the basis of a brightness and/or color comparison and/or edge comparison and/or object comparison of detected objects and their positions relative to each other. In this case, all of these comparison criteria can also define each of the individual quality measurements. At the same time, it is a further advantage if the size of the predefined areas 20s, 20r is adaptable or selected according to certain criteria. The smaller the predefined areas 20s, 20r are, the more time-efficiently and more effectively the similarity of the image areas 20s, 20r can be checked. However, especially when a scene contains a very great number of objects that are confusable and similar in appearance, such as in this shelf example in FIG. 3, it is advantageous to select the predefined areas 20s, 20r larger. If, in this example, the predefined areas 20s, 20r were selected too small, a match in the similarity of these areas would be detected locally, since the two illustrated bottles 18 are similar at least locally. If, on the other hand, a larger area, as shown here, is examined, it is determined that these areas 20s, 20r have differences between each other.

The size of such an area 20s, 20r can, for example, be specified by a user, determined in dependence upon an analysis of a single scene shot S, in dependence upon the analysis of the reference R, from which it can be determined, for example, whether the scene 12 includes similar objects; even metadata can be used which, for example, provide information about the objectives or scope of an experiment which can, for example, be determined via a tag, such as 'shelf study.'

The quality measurement 'image similarity' thus compares the similarity of the environments of the viewpoints B, B' between scene image S and reference R. By means of the image similarity, view images M are, for example, classified by the evaluation unit 24 of the device 22 (see FIG. 5) via threshold values into the quality classes of 'successful/do nothing' and 'to be reviewed/possibly corrected.' In addition, however, there are numerous other quality measurements that can be used for the evaluation of view images M. Using a further quality measurement—whether a view image M should have been made within a scene image S—it is determined whether these view images M are lacking and accordingly assigned to the category 'missing/possibly to be reviewed/possibly determine image.' The remaining images M are assigned to the quality class 'no images/nothing to be done.' Correspondingly, a user can be given suggestions as to which view images M are to be reviewed and which are not. For reviewing, the user can be shown, for example, the scene image S in question with the viewpoint B and the reference R and, if present, the viewpoint B' imaged onto the reference R.

However, in addition to these quality classes, any number of other quality classes can be defined as well. Another example of this is the quality class 'review time interval edges.' In the usual experiments, persons, such as test persons, are normally not looking permanently at the relevant scene. In addition, a briefing of the test persons can be held before such experiments and also a discussion of the experiment afterwards, wherein the scene camera 16 in the meantime continues to take scene shots and the eye tracker continues to determine the view data of the test persons. Ultimately, however, such scenes and view data are not relevant to the evaluation of the test results. In this case, the relevant time intervals can also be determined automatically by the device 22. For example, this can be done through a comparison between the scene shots S and the reference R. If there is no content match whatsoever between scene shots S and reference R, it can be assumed that these scene shots S do not yet form part of a relevant analysis time interval. In other words, if no time interval has been fixed for determining the view images M but these must instead be determined as described, reviewing the edges of time intervals of the view direction images or view images M resulting from the analysis is helpful in evaluating the correctness of the time intervals or defining them correctly. For this reason, the specification of the limits of a time interval via view direction images or view images M can itself be used as a quality measurement and these view images M can be assigned to the quality class 'review time interval edges.' In other words, all view images M which fall within a predefined temporal proximity of such an automatically determined time interval edge can be assigned to this quality class.

In this case, the time interval can even have gaps, hence be interrupted by missing view images M and nevertheless be evaluated as a time interval with respect to the assignment to the quality class 'review time interval edges.' The maximum number of missing view images M to be tolerated can be a second parameter of the classification for this quality class, i.e., a further quality measurement. These aforementioned gaps, or images missing between view images M, are on the other hand assigned to the quality class 'missing/ possibly to be reviewed/possibly determine image.' The remaining images are assigned to the quality class 'no images/nothing to be done.'

In this way, following such a quality class assignment, an analysis software program of the device 22 can also, for example, display the quality classes with their names and, as a text, a corresponding suggestion of an action for the user. The evaluation in accordance with the quality measurements as well as the quality class assignment make numerous other applications possible as well, as will be described in more detail below with reference to FIG. 4.

FIG. 4 shows a flow chart illustrating a method for evaluating a view image M in accordance with an exemplary embodiment of the invention. To this end, at least one quality measurement GM is determined first in step S10. This quality measurement GM or even these quality measurements GM can be predefined and retained in every repeated execution of the method; they can however also be set dynamically as a function of various criteria. As is shown here, the at least one quality measurement GM can be determined, for example, as a function of the input data, that is, the scene shots S, the reference R, the viewpoint data B, the viewpoints B' which may have been imaged, as well as metadata MD optionally provided together with the input data. After specification of the quality measurement GM in step S10, at least a portion of the input data is analyzed in step S12 in order for a particular view image M to be evaluated on this basis in accordance with that particular quality measurement GM. As the result of such an evaluation, a quality value GW for a particular quality measurement GM can be assigned in step S14 to a respective view image M. On the basis of this at least one quality value GW, the relevant view image M can be assigned to a quality class GK of a plurality of defined quality classes. As an additional option, such an assignment can also be made as a function of the metadata MD provided. This quality class assignment is in this case carried out in step S16. In step S18, a first action A1 can now be performed as a function of the assigned quality class GK. For example, such a first action A1 may be provided in the visualization of the imaged viewpoints B' on the reference R together with a visualization of their quality. However, such a first action can also represent any other further processing step for the further processing of the results of the view image M. The selection of such a first action A1 can in addition also depend in turn on the metadata MD provided as well as on the quality values GW themselves. Furthermore, in step S20, a result E1 of the execution of this first action A1 is output. Alternatively or additionally to such a first action A1, a selection AW of view images and/or imaged viewpoints B' can also be made in step S22 and a second action A2 can be performed in step S24 in dependence upon this selection AW. This selection AW can, in turn, be dependent on the quality values GW, on the quality class assignment GK, or on the metadata MD. For example, the highest-rated view images M can be selected according to their quality class assignment GK; only those view images M with the highest rating according to a specific aspect of quality can also be selected according to the corresponding quality measurement GM, i.e., on the basis of the assigned corresponding quality value GW. The selection AW can also represent a particular group of individuals or also a time-related selection which is thus made in dependence upon the metadata MD. If the first action A1 was carried out beforehand, the selection AW can also be made in dependence upon this first action A1 and/or upon a result E1 of this first action A1. In the same way, the second action A2, which is carried out with the selection AW which was made, is in turn selected from the quality values GW and/or depends on the quality class GK and/or the metadata MD. For example, this second action A2 can include a visualization of only the selected view images M or imaged viewpoints B' on the reference R according to their quality class assignment GK or corresponding quality measurement GM. Furthermore, the result of this second action A2 may be provided in turn in step S26 as result E2. In addition, a sequence RF can be defined in step S28. Such a specification of a sequence can, for example, be made directly after the assignment to a quality class GK in step S16 and can accordingly relate to a sequence RF of the quality classes GK, as an external sequence RF, so to speak, and to a sequence RF within the quality classes GK of the individual view images M, as an internal sequence RF, so to speak. In the event that a selection AW was previously made in step S22, the sequence RF can also relate to this selection AW. If, for example, multiple selections AW were made, the sequence RF can in turn define an external sequence RF of these respective selections AW, as well as alternatively or additionally also an internal sequence RF of the individual view images M of such a selection AW. In addition to the quality class GK and the selection AW, the definition of this sequence RF, that is, not only the internal but also the external sequence RF, can in turn be effected as a function of individual quality values GW; as a function of metadata MD, for example, in order to define a temporal sequence RF; and also as a function of the optional first action A1 and/or its result E1; and in the same manner also as a function of the second action A2 and/or its result E2. Depending on such a defined sequence RF, a third action can in turn be performed in step S30, which can furthermore also be optionally dependent on the other variables, i.e., the quality values GW, the quality classes GK, the metadata MD as well as the second action A2 and/or its result E2. Furthermore, the result E3 of this third action A3 is in turn provided in step S32.

In this way, following the assignment of the view images to the respective quality classes GK, different selections AW, sequences RF or actions A1, A2, A3 can be performed, wherein a particular subsequent step of this kind can in turn be dependent on the information provided in previous steps and/or as input data. The method and the device 22 can thus bring about a decision in each case not only on the basis of one or more quality measurements GM or possibly one or more assignments to quality classes GK but also on the basis of previously reached decisions and/or additional criteria and/or intermediate results. In addition to the dependences shown here by way of example, other criteria can be provided for the decision concerning the particular steps. Such criteria may represent variables or data going beyond the quality measurements of view direction images, such as the metadata that can be used to bring about a decision. Criteria are variables/data or derived, combined variables/data which can be acquired, generated and/or recorded in the case of a scene shot S, of a view direction image M and/or in relation to a reference R. User inputs can also be received for particular steps, depending on which such criteria can be specified.

For example, following the quality class assignment GK in step S16, an analysis software program of the device 22 can display as the first action the quality classes GK with their names and, as a text, a corresponding suggestion of an action or operation for the user. The software accordingly shows the user as the first action A1 based on the quality classes GK which view direction images were successful, which should be reviewed, or which are missing. The user can then specify one or more of the quality classes GK as a selection AW and, with the aid of the software, view the corresponding selection AW in a linear/non-linear succession, for example, on the basis of a predefined sequence RF; review the view direction images M manually; and, where applicable, locally adjust them to his expectation, ignore them or delete them on the reference image R. Manual reviewing can, for example, be provided by visualizing the image as a third action A3, by the viewpoint B in the corresponding image S of a scene video being visually displayed together with its imaged viewpoint B' on the reference R.

Actions, such as the first action A1, can also be executed automatically for certain quality classes GK. For example, it is possible to ignore or delete from view images M content which is to be seen in the reference image R but which is hidden by occlusions or objects in the scene image S.

In general, the first and/or second and/or third action for a view direction image or view images M or for a selection of view images M can represent at least one of the following:

a graphical representation, displayable in particular on a
  display device of the device 22,
  on a reference R,
  on a scene shot S,
  as a time series representation for the view direction images M,
  by a highlighting of time intervals (such as segment representation) on a time axis and/or
  by means of different types of representation on a time axis in relation to their selection and/or their quality class membership and/or other intermediate results/final results
taking into consideration in a result/exported data record/statistic,
ignoring and/or filtering in a result/exported data record/statistic,
the deletion/removal of the view direction image(s) M,
the acceptance as valid view direction image(s) M and the saving of such an acceptance for the corresponding view direction image(s) M,
the ignoring as view direction image(s) M to be ignored and the saving of such an ignoring action for the corresponding view direction image(s) M,
a weighting of data in a result/exported data record/statistic, or
a generation and/or transmission of a control signal, which can affect a controller of a process or of a system or of a device, which is dependent on a view direction image M, or on results which are based on a view direction image M.

In addition, the quality evaluation can also be used for a further analysis of the view images M and their results. A further embodiment provides, for example, for a quality graph to be displayed on a display device and for the user to be able to preset a threshold value by clicking it on the display device, i.e., by user input, and thus for two quality classes GK to be specified. These classes may include, for example, the classes 'good' or 'bad,' wherein the threshold value is specified correspondingly by the user. This can be set globally for the entirety of the shots S or also locally for one or more of the scene shots S. In this way, classes for time intervals can also be defined locally. Furthermore, by means of the quality evaluation of view images, a quality report can also be created, for example, based on the merging (on different levels and in many ways) of view direction images M and an overview representation of values, including statistically, for example, also for the scene shots S of multiple participants in a study or repeated scene shots of a single participant, and so on. In addition, a pivotable utilization of results is made possible.

FIG. 5 shows a schematic representation of a device 22 for evaluating at least one view image in accordance with an exemplary embodiment of the invention. In this case, the device 22 has a control unit taking the form of an evaluation unit 24. Furthermore, the device 22 has a first interface 26, via which input data 28 can be supplied to the device. Such input data 28 include data concerning the scene shots S, the reference R, as well as the view data, such as the viewpoints B provided in relation to the scene shots S and the viewpoints B' which may have been imaged correspondingly onto the reference R. The input data 28 may furthermore also optionally include metadata MD, for example, in relation to the scene shots S, the reference R, the viewpoint data B, B' or in general to a specific test, experiment or study to which these input data 28 are provided. Now, the evaluation unit 24 is designed to evaluate the respective view images M, which image the viewpoints B defined in relation to a respective scene shot S onto the reference R, in accordance with at least one specified quality measurement GM and to assign them to a quality class GK depending on this evaluation. Furthermore, the device 22 may also include a second interface 30 for receiving a user input 32. Depending on the user input 32, for example, one or more of the predefined quality measurements GM can be selected in accordance with which the respective view images are evaluated. In addition, the device 22 may also be designed to perform all the further steps described in connection with FIG. 4, such as making a selection AW, defining a sequence RF and/or performing first, second and/or third actions A1, A2, A3. The device may also have a display device (not shown), for example, in order to display results E1, E2, E3 or to output recommendations or information to the user. In this way, on the basis of the quality class GK assigned to a view direction image M, an action can advantageously be applied directly to the view direction image M as a function of the quality class GK. A selection AW can also be created for a particular quality class GK, and an action can in turn be applicable to the selection AW. The selection AW can in this case be present in a chronologically ordered sequence RF or even in a sequence RF determined differently by the device 22. Full quality evaluations can thus be carried out by an efficient method implemented by the device 22, said method deciding about actions directly and/or in real-time and thus leading to the direct and/or real-time further processing of view direction images M.

Accordingly, the device 22 is also designed to, on the basis of the quality class assignment, make a selection AW of view direction images M, to which actions can be applied with no time lag. The device 22 can also specify a sequence of the view direction images M within a selection AW and/or between selections AW, to which one or more actions can then be applied in this thus specified sequence RF. The device 22 [can] decide correspondingly about an action to be performed on a selection AW or leave the decision to a user. After the quality class assignment of the view direction images M has been done, a user can make a selection AW by specifying himself the quality classes GK relevant to the selection AW (the set of quality classes used for the selection). A user can furthermore modify a selection AW made by the device 22 or made by himself, by manually adding and/or removing one or more view direction images M and/or manually changing the set and selection AW of quality classes GK used for the selection AW of view direction images M. Via the user interface 30, the user can also specify the internal and external sequence RF of view direction imags M.

The device 22 is accordingly designed to make a decision about a quality class assignment; an action which is applied to a view direction image M; a selection AW of view direction images M; an (internal) sequence RF within a selection AW of view direction images M by sorting the view direction images M of the selection AW; an (external) sequence RF between selections AW of view direction images M; and/or an action which is applied to a selection AW of view direction images M; making said decision in conjunction with the application of one or more rules and/or one or more classification methods with or without a model. The decisions can also be arrived at by the combination of the non-exhaustively mentioned rules, classification methods with and without model. For example, sequences RF of selections AW or within selections AW can also be created via properties of the scene shot S, on a chronologically linear basis or according to the influence on a result statistic relating to the imaged view directions/view endpoints B'. An internal and external sequence RF can be created by using sorting algorithms. The datum/data used for this purpose can be any input results and/or previously determined intermediate results. In addition, the quality review can be carried out as a function of the objective of the review, which can, for example, be:

Impression gained of the overall quality of the statistics: Summary of the overall quality through statistically representative, exemplary sections of all view direction images;

Improvement of the overall quality by correcting the selected view direction images (including automatic responses to events/annotations, compliance with statistical targets for overall quality and correction time);

Optimization of effort expended on the review/correction in regard to the impact on the statistics (margins of the AOIs, variation analysis);

The invention and its embodiments thus as a whole enable the definition of quality evaluations of view images and offer numerous possibilities for utilizing such quality evaluations.

LIST OF REFERENCE SYMBOLS

10 Person
12 Scene
14 Glasses
16 Scene camera
18 Bottle
20s First predefined image area
20r Second predefined image area
22 Device
24 Evaluation unit
26 Interface
28 Input data
30 User interface
32 User input
A1, A2, A3 Action
AW Selection
B Viewpoint
B' Imaged viewpoint
E1, E2, E3 Result
GK Quality class
GM Quality measurement
GW Quality value
M View image
MD Metadata
R Reference
RD Reference data
RF Sequence
S Scene shot

The invention claimed is:

1. A method comprising:
generating a view image based on a plurality of scene images of a scene and a corresponding plurality of eye tracking measurements;
evaluating the view image with respect to a reference image of the scene according to at least one predefined quality measurement; and
determining whether or not to capture additional scene images of the scene based on a result of the evaluation of the view image.

2. The method of claim 1, wherein generating the view image includes:
determining, based on the plurality of scene images of the scene and the corresponding plurality of eye tracking measurements, a corresponding plurality of viewpoints of the reference image of the scene.

3. The method of claim 2, wherein at least one of the plurality of scene images of the scene is from a different perspective than the reference image of the scene.

4. The method of claim 2, wherein evaluating the view image includes determining a similarity between at least one of the plurality of scene images of the scene and the reference image of the scene.

5. The method of claim 2, wherein evaluating the view image includes determining a similarity between a first area of at least one the plurality of scene images of scene and a second area of the reference image of the scene, wherein the first area is defined by the corresponding eye tracking measurement and the second area is defined by the corresponding viewpoint.

6. The method of claim 2, wherein evaluating the view image includes determining a distribution of the plurality of viewpoints.

7. The method of claim 2, further comprising providing the result of the evaluation of the view image by displaying a visualization of the plurality of viewpoints with respect to the reference image of the scene in which quality assigned to respective ones of the plurality of viewpoints is identified visually.

8. The method of claim 7, wherein respective ones of the plurality of viewpoints are displayed in different colors according to the quality assigned to the respective viewpoint.

9. The method of claim 1, further comprising:
generating a second view image based on a second plurality of scene images of the scene and a corresponding second plurality of eye tracking measurements;
evaluating the second view image according to the at least one predefined quality measurements; and
comparing the result of the evaluation of the second view image with the result of the evaluation of the view image.

10. The method of claim 1, further comprising assigning the view image one of a plurality of quality classes based on the result of the evaluation.

11. An apparatus comprising:
a scene camera to capture a plurality of scene images of a scene;
an eye tracker to generate a corresponding plurality of eye tracking measurements; and
a processor to:
generate a view image based on a plurality of scene images of a scene and a corresponding plurality of eye tracking measurements;

evaluate the view image with respect to a reference image of the scene according to at least one predefined quality measurement; and determine whether or not to capture additional scene images of the scene based on a result of the evaluation of the view image.

12. The apparatus of claim 11, wherein the processor is to generate the view image by determining, based on the plurality of scene images of the scene and the corresponding plurality of eye tracking measurements, a corresponding plurality of viewpoints of the reference image of the scene.

13. The apparatus of claim 12, wherein the processor is to evaluate the view image by determining a similarity between at least a portion of one the plurality of scene images of the scene and at least a portion of the reference image of the scene.

14. The apparatus of claim 12, wherein the processor is to evaluate the view image by determining a distribution of the plurality of viewpoints.

15. The apparatus of claim 12, wherein the processor is to provide the result of the evaluation of the view image by displaying a visualization of the plurality of viewpoints with respect to the reference image of the scene in which quality assigned to respective ones of the plurality of viewpoints is identified visually.

16. The apparatus of claim 11, wherein the processor is further to assign the view image one of a plurality of quality classes based on the result of the evaluation.

17. A non-transitory computer-readable medium encoding instructions which, when executed, cause a processor to perform operations comprising:

generating a view image based on a plurality of scene images of a scene and a corresponding plurality of eye tracking measurements;

evaluating the view image with respect to a reference image of the scene according to at least one predefined quality measurement; and determining whether or not to capture additional scene images of the scene based on a result of the evaluation of the view image.

18. The non-transitory computer-readable medium of claim 17 wherein the instructions, when executed, cause the processor to generate the view image by determining, based on the plurality of scene images of the scene and the corresponding plurality of eye tracking measurements, a corresponding plurality of viewpoints of the reference image of the scene.

19. The non-transitory computer-readable medium of claim 18, wherein the instructions, when executed, cause the processor to evaluate the view image by determining a similarity between at least a portion of one the plurality of scene images of the scene and at least a portion of the reference image of the scene.

20. The non-transitory computer-readable medium of claim 18, wherein the instructions, when executed, cause the processor to evaluate the view image by determining a distribution of the plurality of viewpoints.

\* \* \* \* \*